United States Patent [19]

Tanaka

[11] Patent Number: 5,609,377
[45] Date of Patent: Mar. 11, 1997

[54] VACUUM CHUCK APPARATUS

[75] Inventor: Hirohisa Tanaka, Kanagawa-ken, Japan

[73] Assignee: Fuji Photo Film Co., Ltd., Kanagawa, Japan

[21] Appl. No.: 351,698

[22] Filed: Dec. 8, 1994

[30] Foreign Application Priority Data

Dec. 8, 1993 [JP] Japan .................................. 5-307894

[51] Int. Cl.$^6$ ...................................................... B66C 1/02
[52] U.S. Cl. .............................. 294/65; 294/907; 901/40; 901/46
[58] Field of Search ........................... 294/64.1–65, 907; 901/40, 46, 47; 414/627, 737, 752

[56] References Cited

U.S. PATENT DOCUMENTS

| | | | |
|---|---|---|---|
| 4,648,588 | 3/1987 | Carrell | 901/40 |
| 4,772,170 | 9/1988 | Oldfield | 294/907 |
| 4,793,657 | 12/1988 | Mense | 294/65 |
| 5,048,811 | 9/1991 | Hochbein | 294/64.1 |
| 5,125,706 | 6/1992 | Kuwaki et al. | 294/65 |

FOREIGN PATENT DOCUMENTS

| | | | |
|---|---|---|---|
| 336799 | 10/1989 | European Pat. Off. | |
| 348311 | 12/1989 | European Pat. Off. | |
| 379257 | 7/1990 | European Pat. Off. | 294/64.1 |
| 2604984 | 4/1988 | France . | |
| 2639335 | 5/1990 | France | 901/40 |
| 297381 | 1/1992 | Germany | 901/40 |
| 47-12624 | 5/1972 | Japan . | |
| 47-12625 | 5/1972 | Japan . | |
| 441342 | 2/1992 | Japan . | |

OTHER PUBLICATIONS

Patent Abstracts of Japan, vol. 16 No. 223 (M–1253), May 25, 1992 & JPA 04–041342 (AIDA Eng Ltd), Feb. 12, 1992.

*Primary Examiner*—Dean Kramer
*Attorney, Agent, or Firm*—Sughrue, Mion, Zinn, Macpeak & Seas

[57] ABSTRACT

In a vacuum chuck apparatus for chucking an article, a plurality of movable suction cups are mounted on a support member to be movable up and down relative to the support member between an operative position where each of the movable suction cups can attract the article by suction and a retracted position above the operative position. A plurality of air cylinders move the respective suction cups independently from each other between the operative position and the retracted position. An article size designating circuit outputs a size signal representing the size of the article to be chucked, and a controller controls the air cylinders according to the size signal so that a part of the movable suction cups which are not necessary for chucking the article of the size represented by the size signal are held in the retracted position and the other suction cups are held in the operative position.

5 Claims, 3 Drawing Sheets

VACUUM CHUCK APPARATUS

BACKGROUND OF THE INVENTION

1. Field of the Invention

This invention relates to a vacuum chuck apparatus for chucking an article like a plate, box or the like, and more particularly to a vacuum chuck apparatus which has a plurality of suction cups and in which the number of the suction cups to be actually operated is changed according to the size of the article to be handled.

2. Description of the Prior Art

There has been known a vacuum chuck apparatus for chucking an article like a plate, box or the like such as a glass plate, a corrugated box or the like. The vacuum chuck apparatus has a plurality of suction cups fixed to a base member such as a chuck frame. The suction cups are pressed against a predetermined surface of the article to be chucked and the air in the suction cups is evacuated to make the pressure in the space surrounded by each suction cup and the predetermined surface of the article, whereby the article is chucked by the vacuum chuck apparatus by suction.

When such a vacuum chuck apparatus is used for transferring articles, the vacuum chuck apparatus should agree with the size of the article. However when separate vacuum chuck apparatuses are prepared for the articles of different sizes, operating cost rises and a large space is required.

Accordingly, it is preferred that a single vacuum chuck apparatus can be used for chucking articles of different sizes. An example of such a "free-size" vacuum chuck apparatus is disclosed in Japanese Utility Model Publication No. 47(1972)-12624. In the free-size vacuum chuck apparatus, a plurality of suction cups are mounted in an array on a chuck frame. The suction cups positioned in the middle of the array are fixed to the chuck frame and are constantly operated irrespective of the size of the article to be chucked, while the suction cups positioned in end portions of the array are mounted on the chuck frame to be movable between an operative position where they can chuck the article by suction together with the fixed suction cups and a retracted position above the operative position. When the size of the article to be chucked is small, the suction cups in the end portions are manually moved to the retracted position and held there by means of engagement members. When the size of the article to be chucked becomes larger, the suction cups in the retracted position are moved to the operative position by manually disengaging the engagement members. Thus, the free-size vacuum chuck apparatus can chuck articles of various sizes.

In a free-size vacuum chuck apparatus disclosed in Japanese Utility Model Publication No. 47(1972)-12625, the suction cups in the end portions of a suction cup array are mounted on the chuck frame to be movable between the operative position and the retracted position above the operative position and at the same time held by arms to be rotatable in a horizontal plane. The movable suction cups are manually swung in the horizontal plane when the size of the article to be chucked changes.

Further, in a free size vacuum chuck apparatus disclosed in Japanese Unexamined Patent Publication No. 4(1992)-41342, each suction cup is supported by a shaft and a pinion is formed on an upper part of the shaft. The pinion is in mesh with a pair of opposed rack members extending in a horizontal direction. The position of the suction cup can be manually changed by pushing up the shaft to disengage the pinion from the rack members, moving the shaft along the rack members and then engaging pinion with the rack members again. By selecting the positions of the respective suction cups according to the size of the article to be chucked, the vacuum chuck apparatus can handle articles of various sizes.

In any of the conventional free-size vacuum chuck apparatus, the suction cups are manually moved when changing the size of the articles to be chucked by the vacuum chuck apparatus, and accordingly, in a line where articles of various sizes are transferred mixed together, the line must be stopped to change the positions of the suction cups every time the size of the article changes, which greatly deteriorates the operating efficiency of the line and makes it impossible to use the vacuum chuck apparatus for an unmanned automated system.

SUMMARY OF THE INVENTION

In view of the foregoing observations and description, the primary object of the present invention is to provide a free-size vacuum chuck apparatus in which the number of the suction cups to be actually operated can be automatically changed according to the size of the article to be chucked.

In accordance with the present invention, a plurality of suction cups are arranged in an array and are supported to be movable up and down independently from each other between an operative position where each of the suction cups can attract the article by suction and a retracted position above the operative position. In one embodiment of the present invention, all the suction cups are first positioned in the operative position and some of the suction cups are automatically moved to the retracted position according to a size signal representing the size of the article to be chucked so that only the suction cups necessary for chucking the article of the size represented by the size signal remain in the operative position. In another embodiment of the present invention, all the suction cups are first positioned in the retracted position and some of the suction cups are automatically moved to the operative position according to a size signal representing the size of the article to be chucked so that only the suction cups necessary for chucking the article of the size represented by the size signal are positioned in the operative position.

That is, in accordance with the present invention, there is provided a vacuum chuck apparatus for chucking an article comprising a plurality of movable suction cups mounted on a support member to be movable up and down relative to the support member between an operative position where each of the movable suction cups can attract the article by suction and a retracted position above the operative position, drive means which move the respective movable suction cups up and down relative to the support member independently from each other between the operative position and the retracted position, an article size designating means which outputs a size signal representing the size of the article to be chucked, and a control means which controls the drive means according to the size signal from the article size designating means so that a part of the movable suction cups which are not necessary for chucking the article of the size represented by the size signal are held in the retracted position and the other suction cups are held in the operative position.

The article size designating means may be a means which detects the size of the article and outputs a size signal representing the detected size of the article, or a means which outputs a size signal representing the size of the article which is given by an operator or an external article size detecting means.

The vacuum chuck apparatus of this embodiment may have one or more fixed suction cups which are constantly held in the operative position. Such fixed suction cups are generally disposed in the middle of the array of the suction cups.

The movable suction cups may be normally held in said operative position and selectively moved to the retracted position according to the size of the article to be chucked, or may be normally held in said retracted position and selectively moved to the operative position according to the size of the article to be chucked.

The drive means may comprise a plurality of air cylinders. For example, a single acting retracting air cylinder or a double acting air cylinder may be used. When a double acting air cylinder is used, the pressure at which the suction cup is pressed against the article can be finely adjusted by controlling the pressure of air to be supplied to the air cylinder, which is particularly advantageous when the article to be chucked is fragile, apt to be scratched or soft.

In the vacuum chuck apparatus in accordance with the present invention, the movable suction cups are selectively positioned in the operative position or the retracted position automatically according to the size signal representing the size of the article. Accordingly, the vacuum chuck apparatus can be automatically adapted to various sizes, and the time and labor required for adapting the apparatus to the size of the article to be chucked can be greatly reduced, which results in great reduction of cost and great improvement of the operating efficiency.

DESCRIPTION OF THE PREFERRED EMBODIMENT

Figure 1:
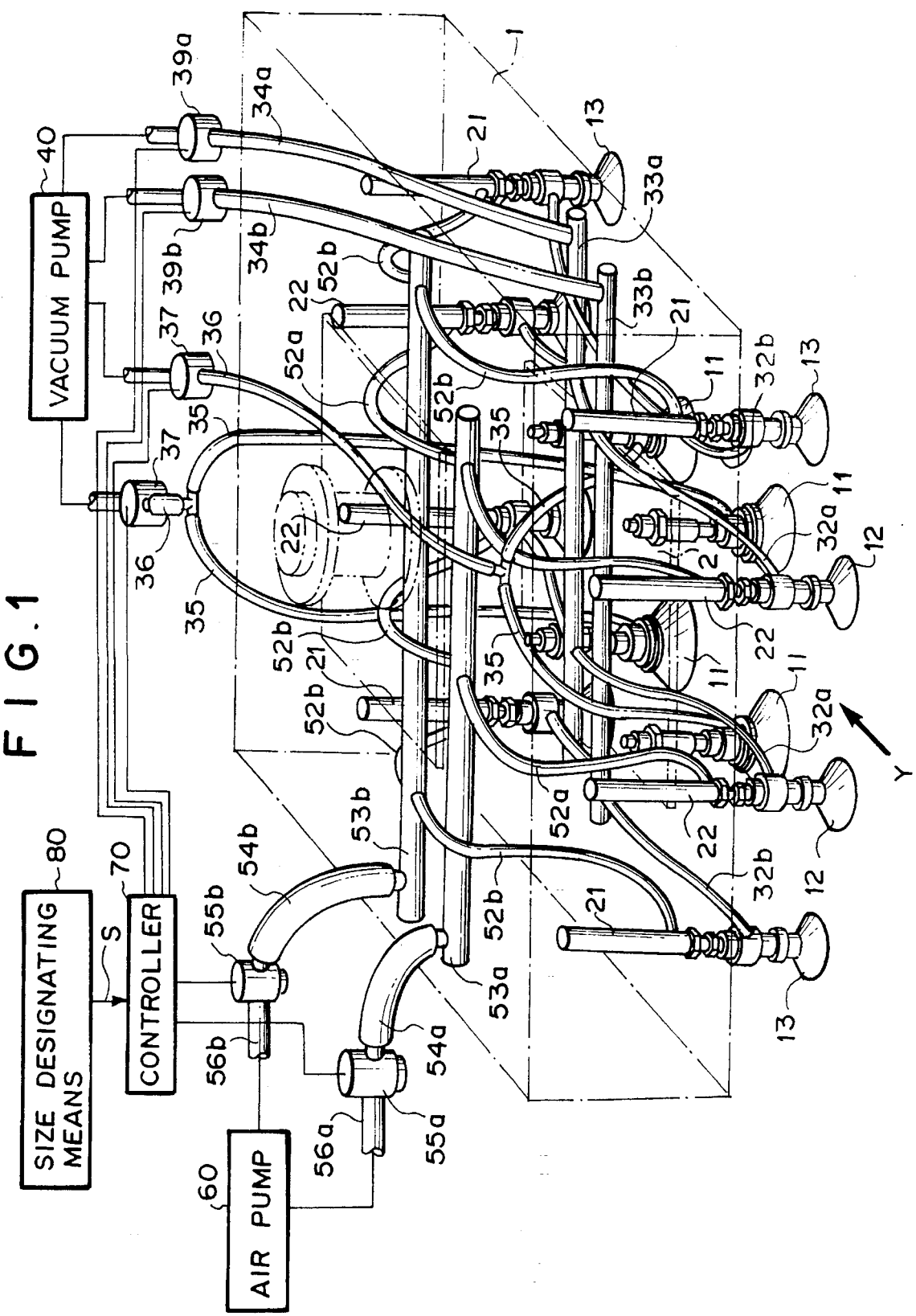
FIG. 1 is a perspective view of a vacuum chuck apparatus in accordance with an embodiment of the present invention.
Figure 2:
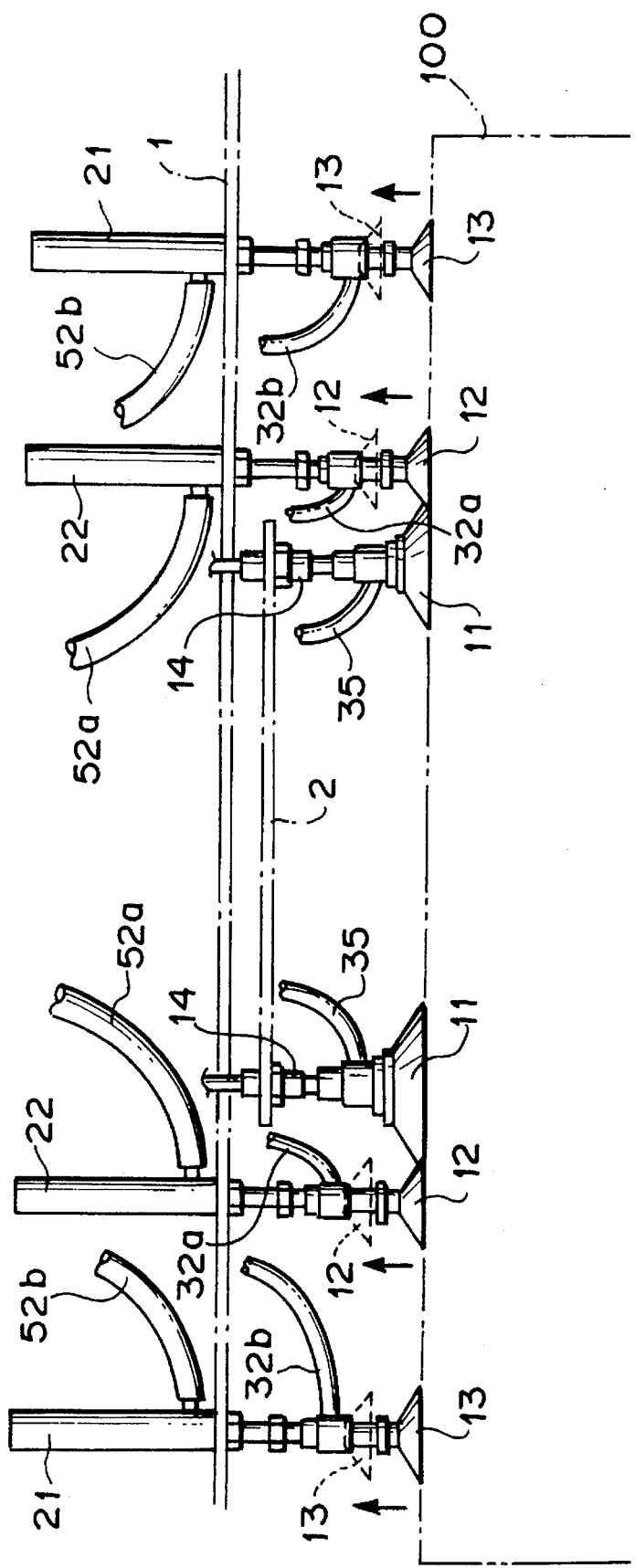
FIG. 2 is a side view of the vacuum chuck apparatus as seen in the direction of arrow Y in FIG. 1.

In FIGS. 1 and 2, a vacuum chuck apparatus in accordance with an embodiment of the present invention includes a support structure comprising a chuck frame 1 which is moved up and down by a lift means (not shown) and a sub frame 2 which is fixed to the chuck frame 1 to be opposed to the lower surface of the chuck frame 1 at a predetermined distance therefrom. Four suction cups 11 are fixed to the sub frame 2 by way of suction cup holders 14, and four suction cups 12 and four suction cups 13 are mounted on the chuck frame 1 to surround the four suction cups 11. The suction cups 12 and 13 are mounted on the chuck frame 1 to be movable up and down and the suction cups 12 are positioned nearer to the center of the chuck frame 1 than the suction cups 13. The suction cups 12 will be referred to as "the inner movable suction cups 12" and the suction cups 13 will be referred to as "the outer movable suction cups 13" while the suction cups 11 will be referred to as "the fixed suction cups 11", hereinbelow.

Each of the fixed suction cups 11 is fixed to the sub frame 2 with its attracting surface faced downward and connected to a vacuum pump 40 through vacuum hoses 35 and 36 and an electromagnetic valve 37. The vacuum hoses 35 for a pair of fixed suction cups 11 which are diagonally opposed to each other (See FIG. 3) are connected to one vacuum hose 36. The electromagnetic valve 37 is opened and closed by a predetermined control signal.

The movable suction cups 12 and 13 are mounted on the chuck frame 1 by way of single acting retracting air cylinders 22 and 21 with their attracting surface faced downward. The movable suction cups 12 and 13 are normally held in the operative position shown by the solid line in FIG. 2, and are lifted to the retracted position shown by the dotted line when the size of the article 100 to be chucked is small and they need not be operated. The air cylinders 22 and 21 lift the movable suction cups 12 and 13 to the retracted position under the pressure of air supplied from an air pump 60.

The air cylinders 22 for the inner movable suction cups 12 and the air cylinders 21 for the outer movable suction cups 13 are connected to the air pump 60 through separate air lines. That is, each of the air cylinders 22 for the inner movable suction cups 12 is connected to a common air pipe 53a through a discrete air hose 52a, and the common air pipe 53a is connected to the air pump 60 through air hoses 54a and 56a. An electromagnetic valve 55a is provided between the air hoses 54a and 56a. Each of the air cylinders 21 for the outer movable suction cups 13 is connected to a common air pipe 53b through a discrete air hose 52b, and the common air pipe 53b is connected to the air pump 60 through air hoses 54b and 56b. An electromagnetic valve 55b is provided between the air hoses 54b and 56b. The electromagnetic valves 55a and 55b are separately opened and closed by a control signal.

Each of the inner movable suction cups 12 is connected to the vacuum pump 40 through a discrete vacuum hose 32a, a common air pipe 33a and a vacuum hose 34a and an electromagnetic valve 39a is provided between the vacuum hose 34a and the vacuum pump 40. Each of the outer movable suction cups 13 is connected to the vacuum pump 40 through a discrete vacuum hose 32b, a common air pipe 33b and a vacuum hose 34b and an electromagnetic valve 39b is provided between the vacuum hose 34b and the vacuum pump 40. The electromagnetic valves 39a and 39b are separately opened and closed by a control signal.

The vacuum chuck apparatus is further provided with an article size designating means 80 which outputs a size signal S representing the size of the article 100 to be chucked and a controller 70 which outputs the control signals for selectively opening and closing the electromagnetic valves 55a, 55b, 37, 39a and 39b according to the size signal S.

The article size designating means 80 may be a means which detects the size of the article 100 and outputs a size signal S representing the detected size of the article 100, or a means which outputs a size signal S representing the size of the article 100 which is given by an operator or an external article size detecting means.

Basically the vacuum chuck apparatus of this embodiment operates in the following manner.

That is, the chuck frame 1 is moved downward until the suction cups in the operative position (11; 11, 12 and 13; 11 and 12; or 11 and 13) are brought into abutment against the upper surface of the article 100 and then further moved downward by about 10 mm (buffer stroke) to press the suction cups against the upper surface of the article 100.

In this state, the electromagnetic valves for supplying suction to the suction cups in the operative position are opened and suction is supplied to the suction cups, whereby the article 100 is attracted by the suction cups by suction.

When the chuck frame 1 is lifted in this state, the article 100 is also lifted.

When the article 100 is to be put on a place, the chuck frame 1 is moved downward to position the article 100 on the place and the electromagnetic valves for supplying suction to the suction cups in the operative position are closed to stop supply of suction to the suction cups. Thereafter air is introduced into the suction cups through vent holes (not shown) and the article 100 is released from the suction cups.

Since the fixed suction cups 11 are constantly held in the operative position, they are normally operated irrespective of the size of the article 100.

According to the size of the article 100, the vacuum chuck apparatus of this embodiment is controlled in the following manner.

Figure 3:
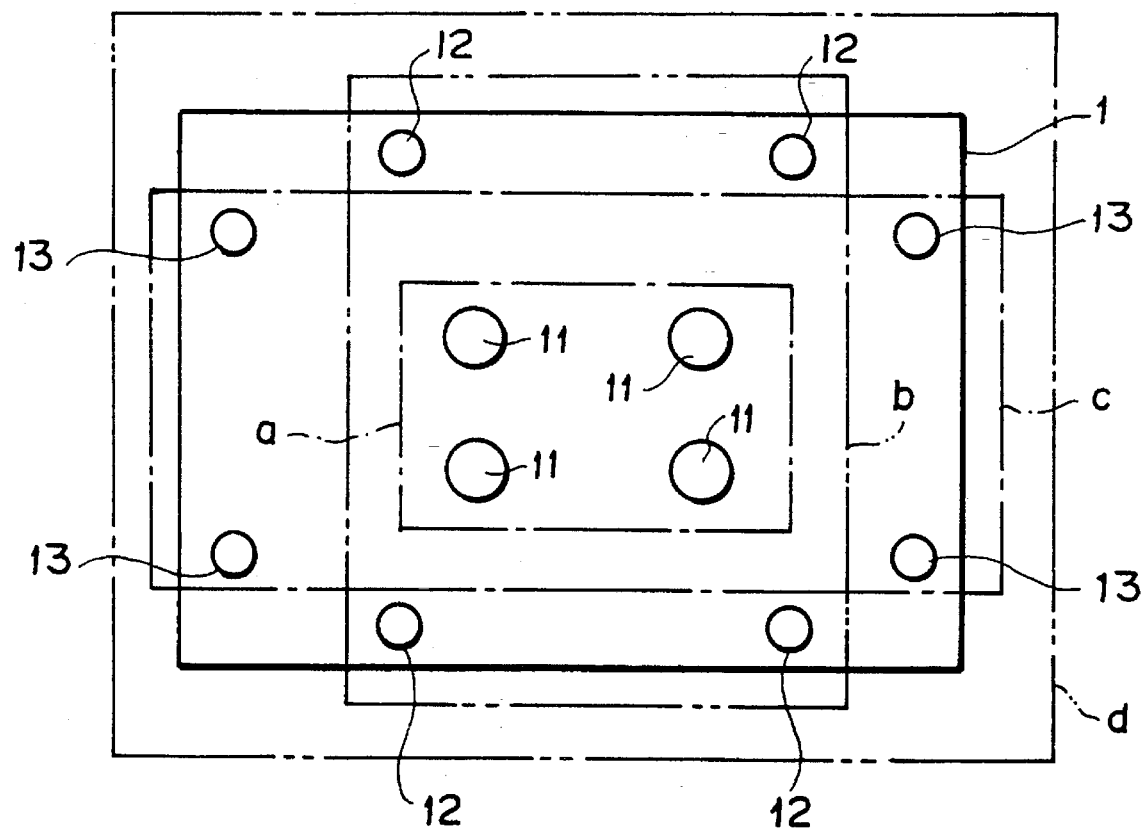
FIG. 3 is a plan view showing the arrangement of the suction cups of the vacuum chuck apparatus shown in FIG. 1.

When the size of the article 100 is as indicated at d in FIG. 3, the article size designating means 80 outputs a size signal $S_d$ representing the size d and the size signal $S_d$ is input into the controller 70. When the size signal $S_d$ is input into the controller 70, the controller 70 causes all the suction cups 11, 12 and 13 to operate. That is, the controller 70 outputs the control signals to close the electromagnetic valves 55a and 55b so that the air cylinders 22 and 21 for the inner movable suction cups 12 and the outer movable suction cups 13 are not supplied with air from the air pump 60, whereby the air cylinders 22 and 21 are all kept stretched and the suction cups 12 and 13 are all held in the operative position. In the operative position, all the suction cups 11 to 13 are positioned in a horizontal plane.

In this state, the chuck frame 1 is moved downward and the suction cups 11 to 13 are all pressed against the upper surface of the article 100, and then the controller 70 outputs the control signals to open the electromagnetic valves 37, 39a and 39b so that all the suction cups 11 to 13 are supplied with suction from the vacuum pump 40, whereby the article 100 is attracted by the suction cups 11 to 13 by suction. When the article 100 is to be released, the controller 70 causes the electromagnetic valves 37, 39a and 39b to close so that supply of suction to the suction cups 11 to 13 is cut.

When the size of the article 100 is as indicated at c in FIG. 3, the article size designating means 80 outputs a size signal $S_c$ representing the size c and the size signal $S_c$ is input into the controller 70. When the size signal $S_c$ is input into the controller 70, the controller 70 causes the inner movable suction cups 12 which are not necessary for chucking the article 100 of the size c to move to the retracted position. That is, the controller 70 outputs the control signal to open the electromagnetic valve 55a so that the air cylinders 22 for the inner movable suction cups 12 are supplied with air from the air pump 60 with the electromagnetic valve 55b kept closed, whereby the air cylinders 22 for the inner movable suction cups 12 are caused to contract and the inner movable suction cups 12 are lifted to the retracted position while the air cylinders 21 for the outer movable suction cups 13 are kept stretched and the outer movable suction cups 13 are kept in the operative position.

In this state, the chuck frame 1 is moved downward and the suction cups 11 and 13 are pressed against the upper surface of the article 100, and then the controller 70 outputs the control signals to open the electromagnetic valves 37 and 39b and to keep the electromagnetic valve 39a closed so that the suction cups 11 and 13 are supplied with suction from the vacuum pump 40, whereby the article 100 is attracted by the suction cups 11 and 13 by suction. When the article 100 is to be released, the controller 70 causes the electromagnetic valves 37 and 39b to close so that supply of suction to the suction cups 11 and 13 is cut.

When the size of the article 100 is as indicated at b in FIG. 3, the article size designating means 80 outputs a size signal $S_b$ representing the size b and the size signal $S_b$ is input into the controller 70. When the size signal $S_b$ is input into the controller 70, the controller 70 causes the outer movable suction cups 13 which are not necessary for chucking the article 100 of the size b to move to the retracted position. That is, the controller 70 outputs the control signal to open the electromagnetic valve 55b so that the air cylinders 21 for the outer movable suction cups 13 are supplied with air from the air pump 60 with the electromagnetic valve 55a kept closed, whereby the air cylinders 21 for the outer movable suction cups 13 are caused to contract and the outer movable suction cups 13 are lifted to the retracted position while the air cylinders 22 for the inner movable suction cups 12 are kept stretched and the inner movable suction cups 12 are kept in the operative position.

In this state, the chuck frame 1 is moved downward and the suction cups 11 and 12 are pressed against the upper surface of the article 100, and then the controller 70 outputs the control signals to open the electromagnetic valves 37 and 39a and to keep the electromagnetic valve 39b closed so that the suction cups 11 and 12 are supplied with suction from the vacuum pump 40, whereby the article 100 is attracted by the suction cups 11 and 12 by suction. When the article 100 is to be released, the controller 70 causes the electromagnetic valves 37 and 39a to close so that supply of suction to the suction cups 11 and 12 is cut.

When the size of the article 100 is as indicated at a in FIG. 3, the article size designating means 80 outputs a size signal $S_a$ representing the size a and the size signal $S_a$ is input into the controller 70. When the size signal $S_a$ is input into the controller 70, the controller 70 causes the inner and outer movable suction cups 12 and 13 which are not necessary for chucking the article 100 of the size b to move to the retracted position. That is, the controller 70 outputs the control signals to open the electromagnetic valve 55a and 55b so that the air cylinders 22 and 21 for the inner and outer movable suction cups 12 and 13 are supplied with air from the air pump 60, whereby the air cylinders 22 and 21 for the inner and outer movable suction cups 12 and 13 are caused to contract and the inner and outer movable suction cups 13 are lifted to the retracted position.

In this state, the chuck frame 1 is moved downward and only the fixed suction cups 11 are pressed against the upper surface of the article 100, and then the controller 70 outputs the control signals to open the electromagnetic valves 37 and to keep the electromagnetic valves 39a and 39b closed so that the fixed suction cups 11 are supplied with suction from the vacuum pump 40, whereby the article 100 is attracted by the fixed suction cups 11 by suction. When the article 100 is to be released, the controller 70 causes the electromagnetic valves 37 to close so that supply of suction to the fixed suction cups 11 is cut.

EXAMPLE

A vacuum chuck apparatus shown in FIG. 1 was made in the following specifications. That is, the fixed suction cups 11 were of urethane rubber and 80 mm in diameter. The inner and outer suction cups 12 and 13 were of urethane rubber and 50 mm in diameter. The air cylinders 21 and 22 were 20 mm in diameter and 25 mm in stroke. The vacuum chuck apparatus was housed in a casing of 500 mm×450 mm×150 mm made by welding thin iron plates and was about 35 kg in weight.

Using the vacuum chuck apparatus, corrugated boxes containing therein photosensitive materials were handled. The sizes and the weights of the corrugated boxes were as follows.

(a) 100 mm×150 mm×150 mm, 8 kg (b) 210 mm×270 mm×170 mm, 10 kg (c) 300 mm×440 mm×300 mm, 15 kg (d) 500 mm×600 mm×200 mm, 20 kg

An AC power source of the commercial power frequency was used and an air compressor which could output 5 kg/cm$^2$ air pressure was used. The size switching was effected within 1 second. The attracting force obtained solely by the fixed suction cups 11 was 40 kg (vacuum pressure), that obtained by the fixed suction cups 11 and the inner movable suction cups 12 was 52 kg and that obtained by the fixed suction cups 11 and the inner and outer movable suction cups 12 and 13 was 64 kg.

The maximum load of the vacuum chuck apparatus was 60 kg, the maximum lifting speed was 1000 mm/sec, and the maximum rotational speed about the vertical axis and the horizontal axis was 2.44 rad/sec (140° C./sec). The article positioning accuracy of the apparatus was within plus or minus 1 mm.

As can be understood from the description above, in the vacuum chuck apparatus of this embodiment, the movable suction cups 12 and 13 are selectively positioned in the operative position or the retracted position automatically according to the size signal representing the size of the article. Accordingly the vacuum chuck apparatus can be automatically adapted to various sizes, and the time and labor required for adapting the apparatus to the size of the article to be chucked can be greatly reduced, which results in great reduction of cost and great improvement of the operating efficiency.

Though, in the embodiment described above, a single acting retracting air cylinder is used as the drive means for moving the movable suction cup between the operative position and the retracted position, other various drive means may be used. For example, a double acting air cylinder may be used and hydraulic or mechanical drive means may be used. When a double acting air cylinder is used, the pressure at which the suction cup is pressed against the article can be finely adjusted by controlling the pressure of air to be supplied to the air cylinder, which is particularly advantageous when the article to be chucked is fragile, apt to be scratched or soft.

What is claimed is:

1. A vacuum chuck apparatus for chucking an article, comprising:

a plurality of movable suction cups mounted in a suction cup array on a support member and operative to move up and down relative to the support member between an operative position where each of the movable suction cups can attract the article by suction and a retracted position above the operative position, drive means for moving the respective movable suction cups up and down relative to the support member independently from each other between the operative position and the retracted position, said drive means including a plurality of air cylinders mounted on said support member, with each of said air cylinders associated with a corresponding one of the movable suction cups, an air pump for supplying pressurized air to said air cylinders, air lines which connect said air pump to said air cylinders, and valve means located in said air lines between said air pump and said air cylinders and for opening and closing said air lines, said valve means comprising first and second electromagnetic valves, and in which each of said air cylinders in a first group thereof is connected to a first common air pipe through a discrete air hose, and said first common air pipe is connected to said air pump via said first electromagnetic valve, whereas each of said air cylinders in a second group thereof is connected to a second common air pipe through a discrete air hose, and said second common air pipe is connected to said air pump via said second electromagnetic valve, an article size designating means for outputting a size signal representing the size of the article to be chucked, and a control means for controlling the drive means according to the size signal from the article size designating means so that a part of the movable suction cups which are not necessary for chucking the article of the size represented by the size signal are held in the retracted position and the other suction cups are held in the operative position.

2. A vacuum chuck apparatus as defined in claim 1, further comprising at least one fixed suction cup which is positioned in the middle of the suction cup array and is constantly held in the operative position.

3. A vacuum chuck apparatus as defined in claim 1 or 2, in which said movable suction cups are normally held in said operative position and are selectively moved to the retracted position according to the size of the article to be chucked.

4. A vacuum chuck apparatus as defined in claim 1 or 2, in which said movable suction cups are normally held in said retracted position and are selectively moved to the operative position according to the size of the article to be chucked.

5. A vacuum chuck apparatus as defined in claim 1, in which said first and second electromagnetic valves are separately opened and closed by said control means.

* * * * *